(12) United States Patent
Hu et al.

(10) Patent No.: US 9,772,506 B2
(45) Date of Patent: Sep. 26, 2017

(54) CONFIGURATION OF FLEXIBLE CONNECTIONS USED IN A LENS DRIVING MODULE

(71) Applicant: TDK TAIWAN CORP., Yangmei, Taoyuan County (TW)

(72) Inventors: Chao-Chang Hu, Yangmei (TW); Fu-Yuan Wu, Yangmei (TW); Shih-Ting Huang, Yangmei (TW); Yi-Hsin Nieh, Yangmei (TW)

(73) Assignee: TDK TAIWAN CORP., Yangmei, Taoyuan County (TW)

(*) Notice: Subject to any disclaimer, the term of this patent is extended or adjusted under 35 U.S.C. 154(b) by 12 days.

(21) Appl. No.: 14/937,113

(22) Filed: Nov. 10, 2015

(65) Prior Publication Data

US 2016/0131923 A1    May 12, 2016

Related U.S. Application Data

(60) Provisional application No. 62/078,526, filed on Nov. 12, 2014.

(51) Int. Cl.
*G02B 27/64* (2006.01)
*G02B 7/09* (2006.01)
*G02B 7/10* (2006.01)

(52) U.S. Cl.
CPC ............. *G02B 27/646* (2013.01); *G02B 7/09* (2013.01); *G02B 7/10* (2013.01)

(58) Field of Classification Search
CPC ......... G02B 27/646; G02B 7/04; G03B 17/00
USPC .......... 396/529; 348/340; 359/819, 822, 823
See application file for complete search history.

(56) References Cited

U.S. PATENT DOCUMENTS

2010/0316363 A1* 12/2010 Chou .................. G02B 27/646
                                                         396/55
2013/0215511 A1*  8/2013 Wu ...................... H04N 5/23287
                                                         359/554

* cited by examiner

*Primary Examiner* — Rochelle-Ann J Blackman
(74) *Attorney, Agent, or Firm* — Locke Lord LLP; Tim Tingkang Xie, Esq.

(57) ABSTRACT

The present invention provides some configurations of flexible connections jointly or integrally formed with a movable part and/or a fixed part of a lens module. The flexible connections may move the movable part along an optical axis direction and/or directions perpendicular to the optical axis. The configuration and material of the flexible connections provide an enhanced strength bearing plastic deformation, and hence increasing the structure strength of the lens module. The formation of the flexible connections with the movable part and/or the fixed part with one mold-injection process can reduce parts of the lens module and simply its manufacturing process.

14 Claims, 12 Drawing Sheets

CONFIGURATION OF FLEXIBLE CONNECTIONS USED IN A LENS DRIVING MODULE

CROSS-REFERENCE TO RELATED APPLICATION

This application claims benefit of U.S. Provisional Patent Application No. 62/078,526 filed Nov. 12, 2014, the entire contents of which are hereby incorporated by reference.

BACKGROUND OF THE INVENTION

Field of the Invention

The present invention relates to a configuration of flexible connections between a movable part and a fixed part of a lens driving module with OIS means and, more particularly, to a configuration of plastic flexible connections jointly or integrally formed with the movable part and/or the fixed part.

Description of the Prior Art

It is an issue to be addressed for people skilled in a field of optical image capturing technology to reduce or eliminate a hand-shake impact of an image picture from a photographer during a photographing action. Optical image stabilization (OIS) technology is rapidly developed and now has become a primary hand-shake correction technique. The OIS technology can prevent image quality from getting worse caused by software correction and its lengthy process time. Recently, a common magnet scheme is proposed to be used in the OIS technology. The common magnet scheme employs a set of common magnets to drive two sets of coils to move a lens assembly along an optical axis direction and directions perpendicular to the optical axis so as to attain purposes of auto-focusing and hand-shake correction.

Figure 1A:
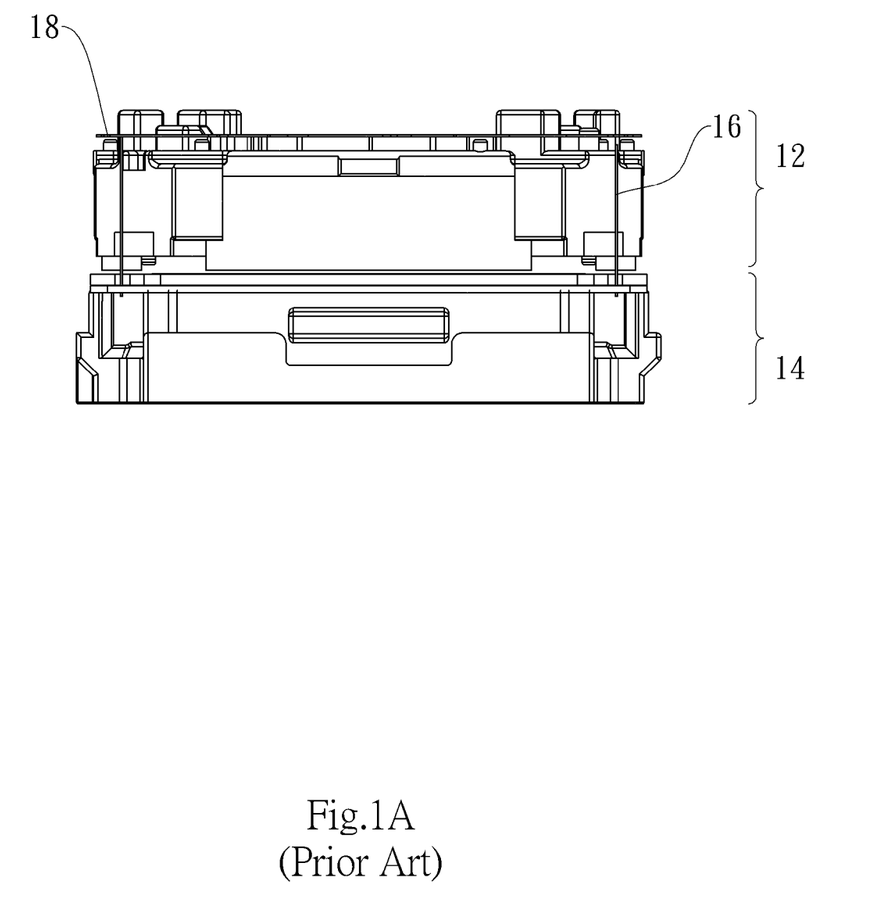
FIG. 1A is a schematic side view of a prior-art lens module.
Figure 1B:
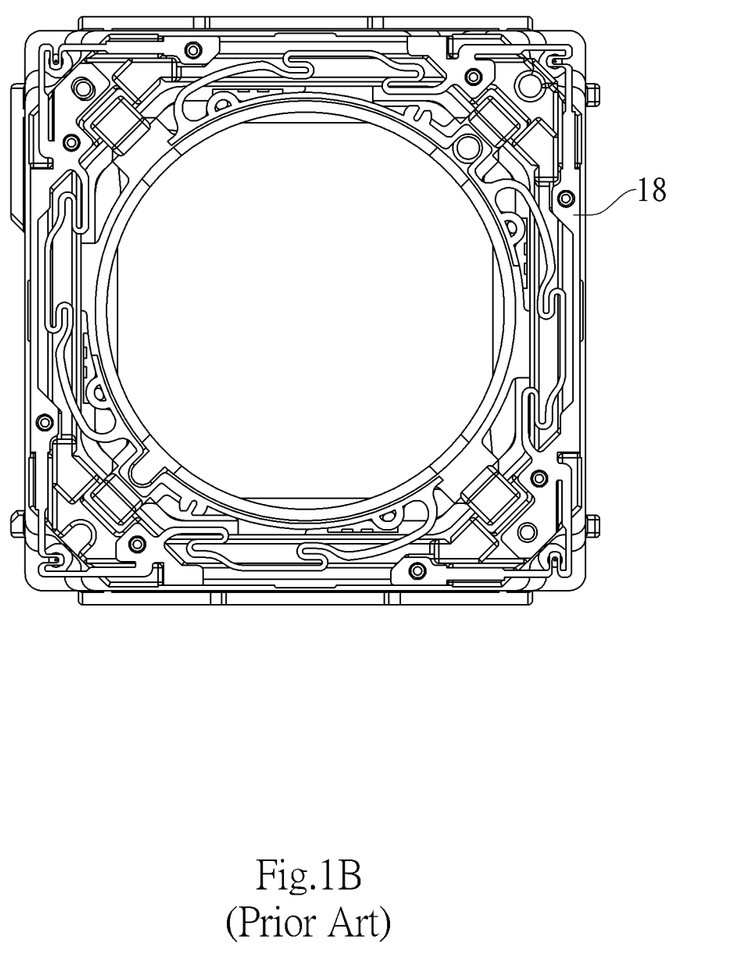
FIG. 1B is a schematic top view of the prior-art lens module.

FIG. 1A is a schematic side view of a prior-art lens module provided with OIS means utilizing the common magnet scheme. FIG. 1B is a schematic top view of the lens module. Several metal suspension wires 16 connect with an upper metal spring 18 to connect a movable part 12 and a fixed part 14 of the lens module. The movable part 12 includes a lens module, auto-focusing coil and a set of magnets except for the upper metal spring 18. The fixed part 14 includes an OIS coil plate, a printed circuit board and a base. The metal spring 18 is used to restore an original position of the movable part 12 when a photographing action is completed. The metal suspension wires 16 are used to support the movable part 12 on the fixed part 14 and provide electrical connection between the auto-focusing coil and the printed circuit board. The prior art lens module has some drawbacks, for example, the metal spring 18 easily becomes plastic deformation and may generate resonance. The more separate parts of the lens module also make its manufacturing process become complicated.

It is desirable to address the above drawbacks for the lens module with OIS means.

SUMMARY OF THE INVENTION

It is an object of the present invention to provide some kinds of configuration of flexible connections jointly or integrally formed with a movable part and/or a fixed part of a lens module to eliminate elements used in the lens module, and hence simplifying its manufacturing process.

It is one another object of the present invention to provide flexible connections between the movable part and the fixed part to enhance the structure strength of the lens module.

It is a further another object of the present invention to provide flexible connections between the movable part and the fixed part to eliminate resonance phenomenon of the lens module.

In one aspect, the present invention provides a lens module comprising a movable part, a fixed part and a plurality of wave-shaped flexible elements connected between the movable part and fixed part. The wave-shaped flexible elements may be jointly or integrally formed with the movable part, or may be jointly or integrally formed with the fixed part. The wave-shaped elements can move the movable part along an optical axis OO' direction of the lens module and also can move the movable part along directions perpendicular to the optical axis OO'.

In one another aspect, the present invention provides a lens module comprising a plurality of first flexible elements jointly or integrally formed with a movable part and a plurality of second flexible elements jointly or integrally formed with a fixed part. The first flexible elements move the movable part along an optical axis of the lens module, and the second flexible elements move the movable part along directions perpendicular to the optical axis.

In one embodiment of the present invention, the first flexible elements are wave-shaped and the second flexible elements are composed of ball-shaped sub-elements connected in series. In one alternation, the first flexible elements may be serrated shape at their opposite longitudinal sides. In one alternation, the second flexible element may has a rectangular body each of its surfaces along a longitudinal direction provided with a plurality of concave surfaces and flat surfaces alternately distributed on the surface. In one alternation, the second flexible element may be a cylindrical body.

In still one another aspect, the present invention provides a lens module comprising a plurality of first flexible elements and a plurality of second flexible elements jointly or integrally formed with a movable part and a plurality of third flexible elements jointly or integrally with a fixed part. The first flexible elements and second flexible elements move the movable part along an optical axis of the lens module, and the third flexible elements move the movable part along directions perpendicular to the optical axis. In one embodiment of the present invention, the first and second flexible elements may be serrated shape at their opposite longitudinal sides. In one embodiment of the present invention, the third flexible elements are composed of ball-shaped sub-elements connected in series. In one alternation, the third flexible element may has a rectangular body each of its surfaces along a longitudinal direction provided with a plurality of concave surfaces and flat surfaces alternately distributed on the surface. In one alternation, the third flexible element may be a cylindrical body.

DETAILED DESCRIPTION OF THE PREFERRED EMBODIMENTS

The present invention now will be described more fully hereinafter with reference to the accompanying drawings, in which preferred embodiments of the present invention are shown.

Figure 2A:
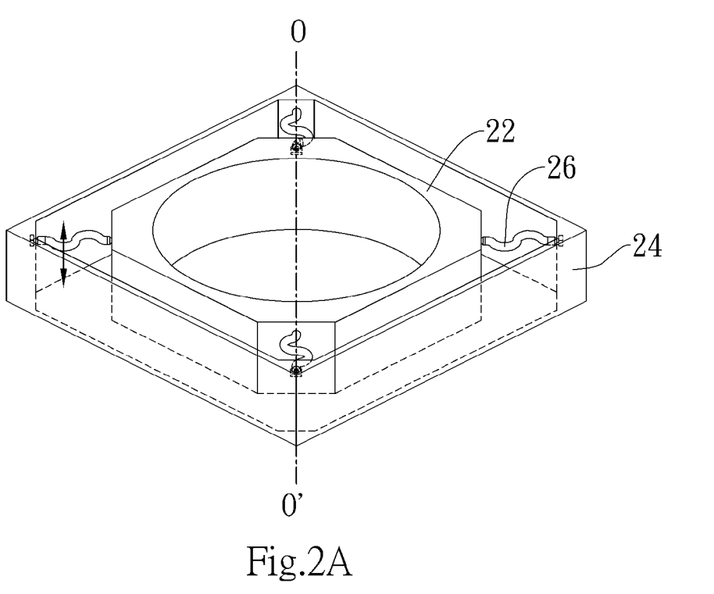
FIG. 2A is a schematic perspective view of a partial portion of a lens module according to a first embodiment of the present invention.
Figure 2B:
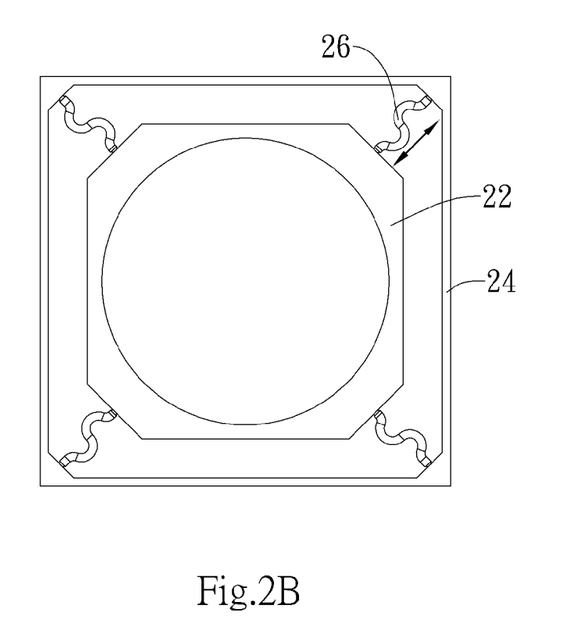
FIG. 2B is a schematic top view of the partial portion of the lens module according to the first embodiment of the present invention.
Figure 2C:
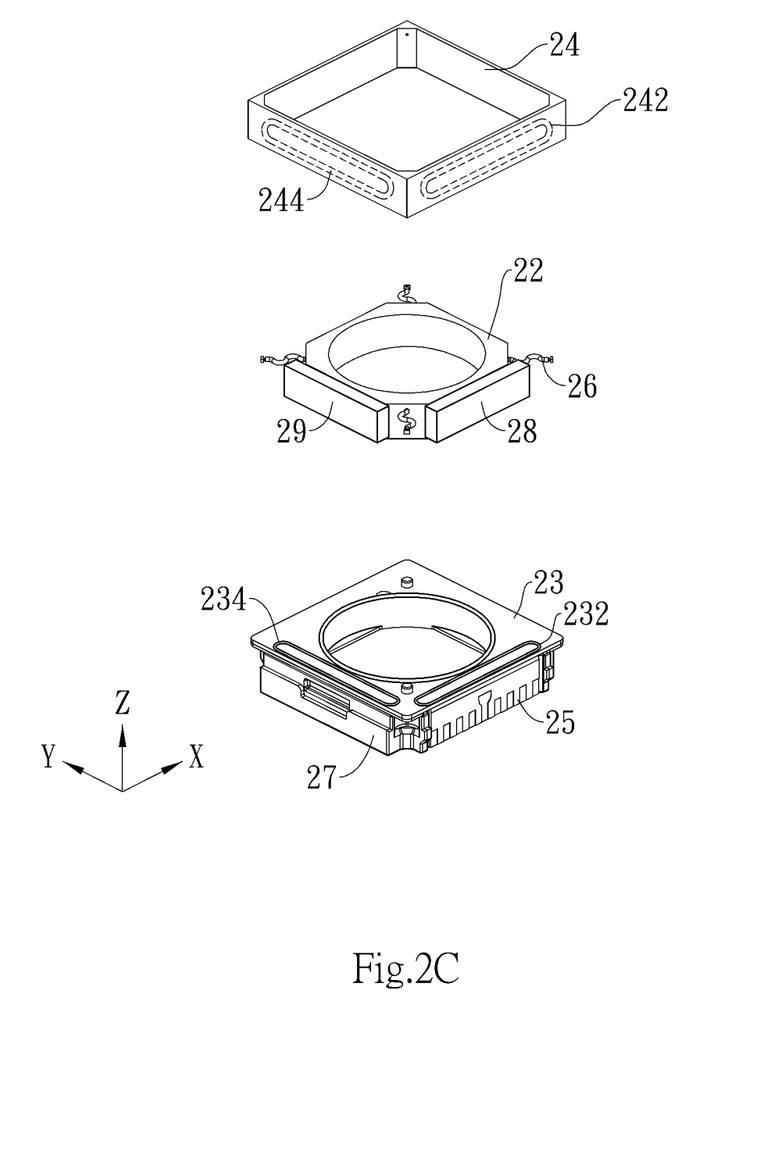
FIG. 2C is a schematic exploded view of a partial portion of the lens module of the first embodiment of the present invention.

FIG. 2A is a schematic perspective view of a partial portion of a lens module according to a first embodiment of the present invention, in which some parts and components are omitted in order to clearly show characteristic structures of the present lens module. FIG. 2B is a schematic top view of the partial portion of the lens module. FIG. 2C is a schematic exploded view of a partial portion of the lens module of the first embodiment, showing a more detailed structure. In the first embodiment, the lens module comprises a movable part 22, a fixed part 24 and a plurality of wave-shaped plastic flexible elements 26 connecting between the movable part 22 and fixed part 24. The wave-shaped plastic flexible elements 26 may be jointly or integrally formed with the movable part 22, or may be jointly or integrally formed with the fixed part 24. In other words, the wave-shaped plastic flexible elements 26 and the movable part 22 may be formed together with one mold-injection process. Optionally, the wave-shaped plastic flexible elements 26 and the fixed part 24 may be formed together with one mold-injection process. Preferably, the wave-shaped plastic flexible elements 26 may be connected unto outer planar surfaces of the movable part 22 in parallel to an optical axis OO' of the lens module. Preferably, there are four wave-shaped plastic flexible elements 26 symmetrically connecting between the movable part 22 and the fixed part 24. Specifically, see FIG. 2C, the movable part 22 has four symmetric cutting corners respectively accommodating the four wave-shaped plastic flexible elements 26. Each of the four cutting corners forms an outer planar surface of the movable part 22 in parallel to the optical axis OO' of the lens module so that the wave-shaped plastic flexible element 26 may be integrally connected unto the outer planar surface of the movable part 22. By the configuration of the cutting corner, the length of the wave-shaped plastic flexible elements 26 can be extended to enhance its strength bearing plastic deformation. Please note the wave-shaped flexible element 26 is not limited to be made of plastic material. Other material, such as metal material may be used to form the wave-shaped flexible element 26. Also, the wave-shaped plastic flexible elements 26 may be un-symmetrically connected unto the movable part 22 and the fixed part 24. As shown in FIG. 2A and FIG. 2B, the wave-shaped plastic flexible elements 26 can move the movable part 22 along the optical axis OO' direction and also can move the movable part 22 along directions perpendicular to the optical axis OO'. See FIG. 2C, the lens module of the first embodiment further comprises an X-axis AF coil 242 positioned at an inner side wall of the fixed part 24 and an Y-axis AF (Auto-Focusing) coil 244 positioned at another inner side wall of the fixed part 24. An OIS coil plate 23 is positioned below the movable part 22, and an X-axis OIS (Optical Image Stabilization) coil 232 and an Y-axis OIS coil 234 respectively provided on the OIS coil plate 23. An X-axis magnet 28 is positioned at one outer side wall of the movable part 22, with a surface facing the X-axis AF coil 242 and another surface facing the X-axis OIS coil 232. An Y-axis magnet 29 is positioned at another outer side wall of the movable part 22, with a surface facing the Y-axis AF coil 244 and another surface facing the Y-axis OIS coil 234. A flexible printed circuit board 25 is positioned under the OIS coil plate 23. A base 27 is disposed below the flexible printed circuit board 25. However, the lens module of the first embodiment is not limited by two magnets scheme and/or two coils scheme. Four magnets scheme and/or four coils scheme also may be applied instead of the configurations of the magnets and AF/OIS coils of the first embodiment. The fixed part 24, the OIS coil plate 23, the flexible printed circuit board 25 and the base 27 are unmoved when performing an auto-focusing action and a hand-shaking correction action.

Figure 3:
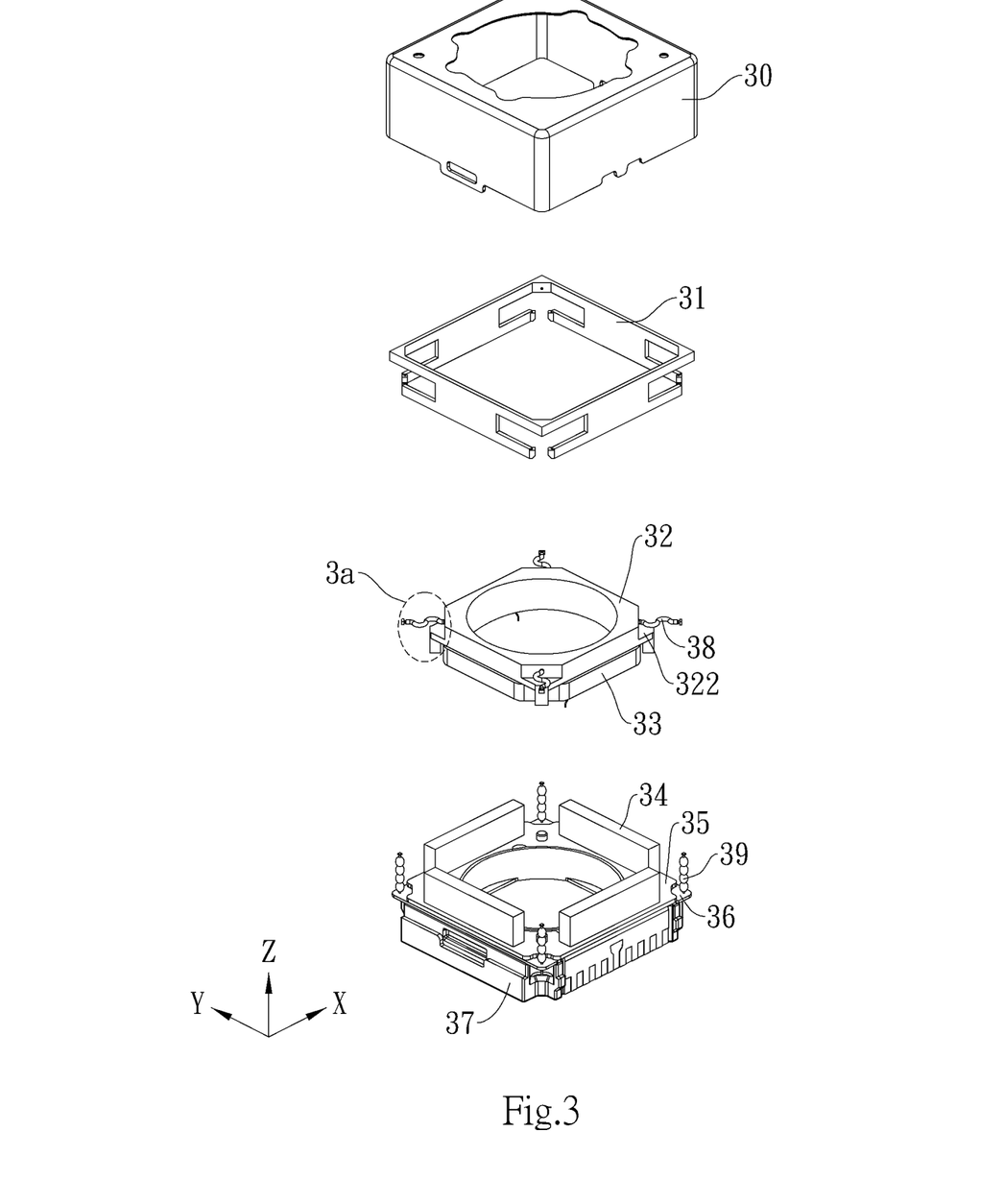
FIG. 3 is a schematic exploded view of a partial portion of a lens module according to a second embodiment.
Figure 4:
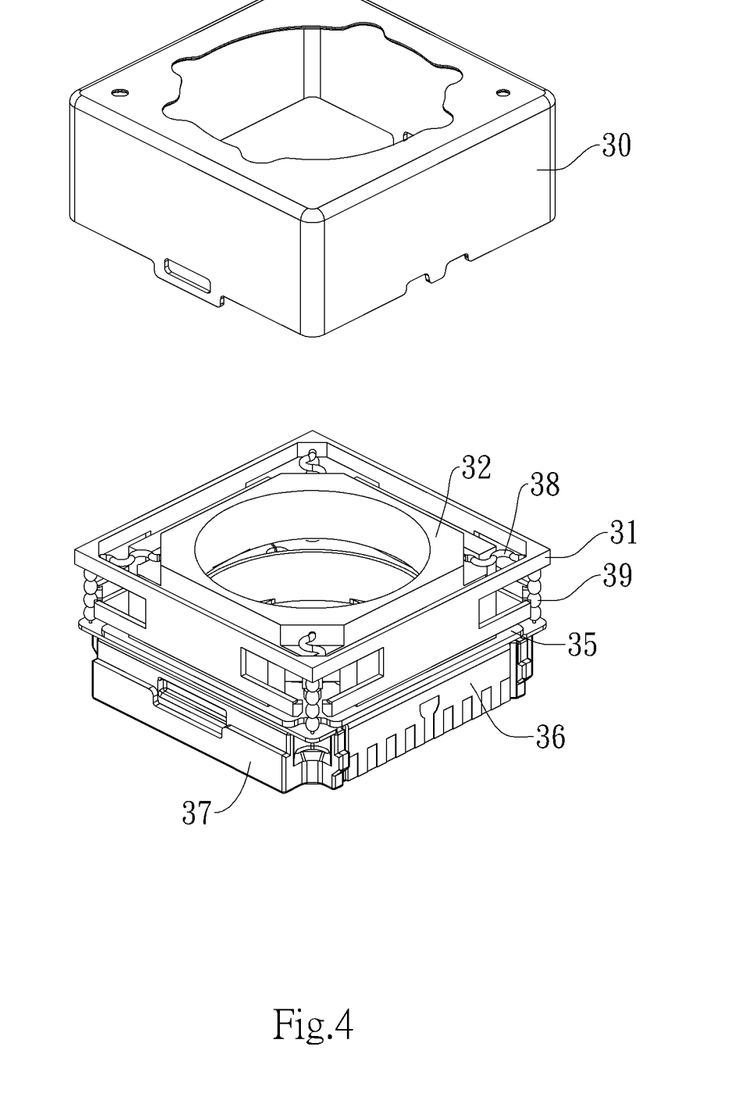
FIG. 4 is another schematic exploded view of the lens module of the second embodiment.

FIG. 3 is a schematic exploded view of a lens module with OIS means according to a second embodiment of the present invention. FIG. 4 is another schematic exploded view of the lens module of the second embodiment. In the second embodiment, the lens module comprises an upper cover 30, a frame 31, a lens barrel 32 in which lenses and some other elements are omitted, an auto-focusing coil 33, a set of magnets 34, an OIS coil plate 35, a printed circuit board 36 and a base 37. Preferably, the lens barrel 32 is provided with four L-shaped accommodation space 322 symmetrically around an upper portion of its outer surrounding. Four first plastic flexible elements 38 are individually received in one of the L-shaped accommodation space 322, and being jointly or integrally formed with the lens barrel 32. Specifically, an outer planar surface of the lens barrel 32 in parallel to an optical-axis direction (i.e. Z-axis direction) of the lens barrel 32, and an outer planar surface of the lens barrel 32 perpendicular to the optical axis constitute the L-shaped accommodation space 322. The first plastic flexible element 38 may be integrally connected unto the outer planar surface of the lens barrel 32 in parallel to the optical axis. It means the first plastic flexible elements 38 and the lens barrel 32 may be formed together with one mold-injection process. Alternatively, the first plastic flexible elements 38 may be jointly or integrally formed with the frame 31. In other words, the first plastic flexible elements 38 and the frame 31 can be formed together with one mold-injection process. Please note this configuration is not shown in a drawing but one skilled person in the art would readily know how to accomplish this configuration in view of the configuration of the first plastic flexible elements 38 and the lens barrel 32. The design of the L-shaped accommodation space 322 can advantageously lengthen the first plastic flexible element 38 to enhance its strength bearing plastic deformation without increasing the volume of the lens module. The lens barrel 32 is provided with an accommodation space at its lower portion for placing the auto-focusing coil 33. The magnets 34 are symmetrically positioned to face the auto-focusing coil 33. The frame 31 accommodates the lens barrel 32, the auto-focusing coil 33, the magnets 34 and the first plastic flexible element 38. One end of each of the first plastic flexible elements 38 is jointed to one corner of the frame 31 such that the first plastic flexible elements 38 are symmetrically positioned between the frame 31 and the lens barrel 32. Please note the first flexible element 38 is not limited to be made of plastic material. Other material, such as metal material may be used to form the first flexible element 38. Also, the first plastic flexible elements 38 may be un-symmetrically connected unto the lens barrel 32 and thus may be un-symmetrically connected unto the frame 31. Four second plastic flexible elements 39 are symmetrically and individually provided at four corners of the printed circuit board 36. The second plastic flexible elements 39 are jointly or integrally formed with the printed circuit board 36. It means the second plastic flexible elements 39 and the printed circuit board 36 may be formed together with one mold-injection process. Alternatively, the second plastic flexible elements 39 may be jointly or integrally formed with the frame 31. It means the second plastic flexible elements 39 and the frame 31 may be formed together with one mold-injection process. Please note this configuration is not shown in a drawing but one skilled person in the art would readily know how to accomplish this configuration in view of the configuration of the second plastic flexible elements 39 and the printed circuit board 36. One end of each of the second plastic flexible elements 39 opposite to the printed circuit board 36 is jointed to one corner of the frame 31 such that the second plastic flexible elements 39 are symmetrically positioned between the frame 31 and the printed circuit board 36. Please note the second flexible element 39 is not limited to be made of plastic material. Other material, such as metal material may be used to form the second flexible element 39. Also, the second plastic flexible elements 39 may be un-symmetrically connected unto the lens barrel 32 and thus may be un-symmetrically connected unto the frame 31. The OIS coil plate 35 is positioned between the frame 31 and the printed circuit board 36, and electrically communicated with the printed circuit board 36. The OIS coil plate 35 comprises several coils face the magnets 34 and share the magnets 34 with the auto-focusing coil 33. The printed circuit board 36 is positioned on the base 37, and the upper cover 30 houses the frame 31, the lens barrel 32, the auto-focusing coil 33, the magnets 34, the OIS coil plate 35 and the printed circuit board 36, the first plastic flexible elements 38 and the second plastic flexible elements 39. The frame 31, the lens barrel 32, the auto-focusing coil 33, the magnets 34 and the first plastic flexible elements 38 constitute a movable part of the present lens module. The OIS coil plate 35, the printed circuit board 36, the base 37 and the second plastic flexible elements 39 constitute a fixed part of the lens module. The first plastic flexible elements 38 move the movable part along the optical axis direction, i.e. Z-axis direction in the second embodiment, to perform auto-focusing function. The second plastic flexible elements 39 move the movable part along directions perpendicular to the optical axis, i.e. X and Y directions.

Figure 5A:
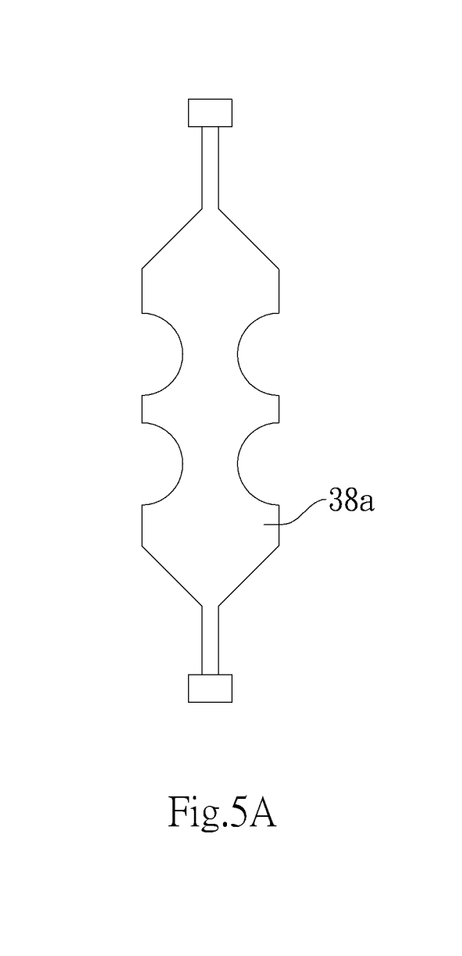
FIG. 5A is a schematic cross-sectional view of a variation of a first flexible element of the lens module of the second embodiment.
Figure 5B:
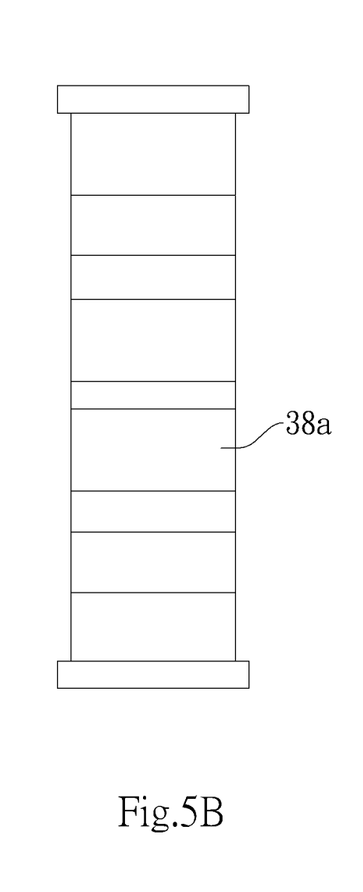
FIG. 5B is a schematic side view of the variation of the first flexible element shown in FIG. 5A.
Figure 6:
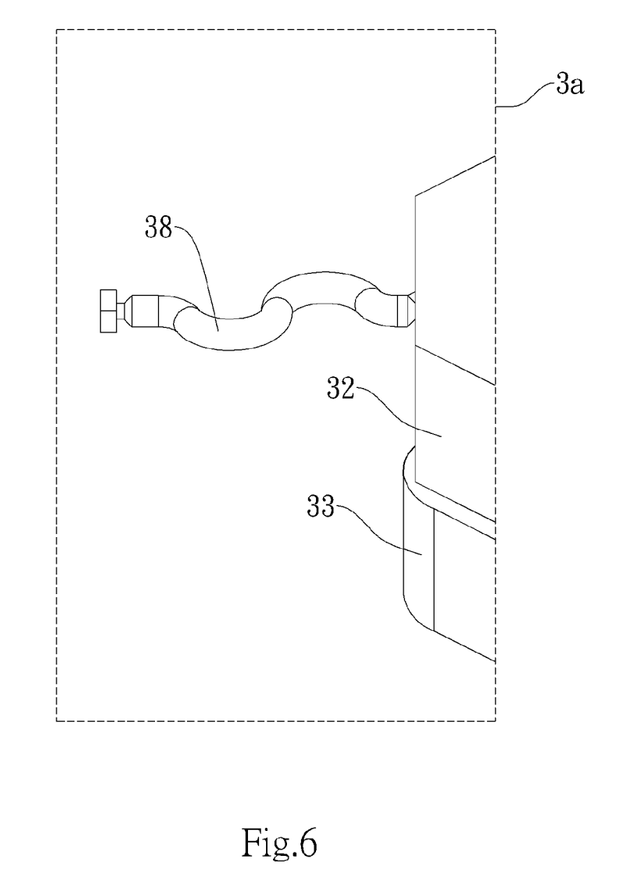
FIG. 6 is a schematic view of a partial portion of a variation of the second embodiment shown in FIG. 3.
Figure 7A:
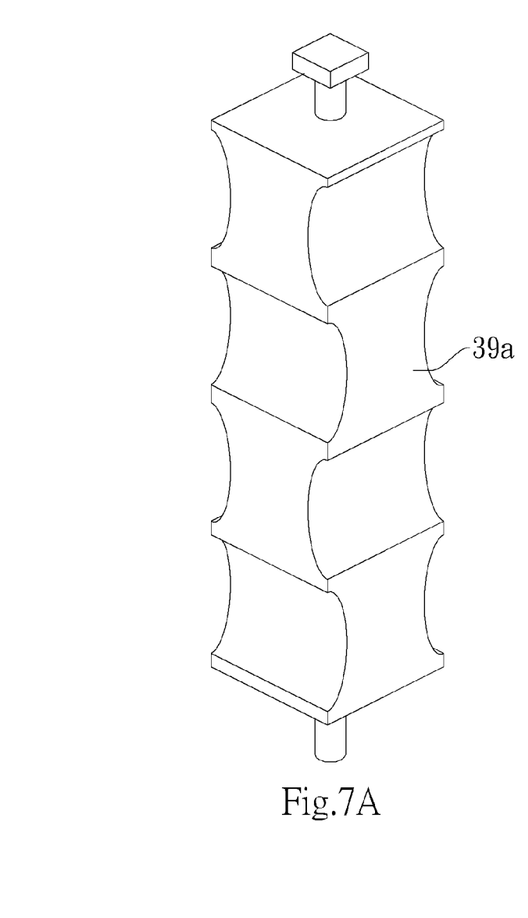
FIG. 7A is a schematic perspective view of a variation of a second flexible element of the lens module of the second embodiment.
Figure 7B:
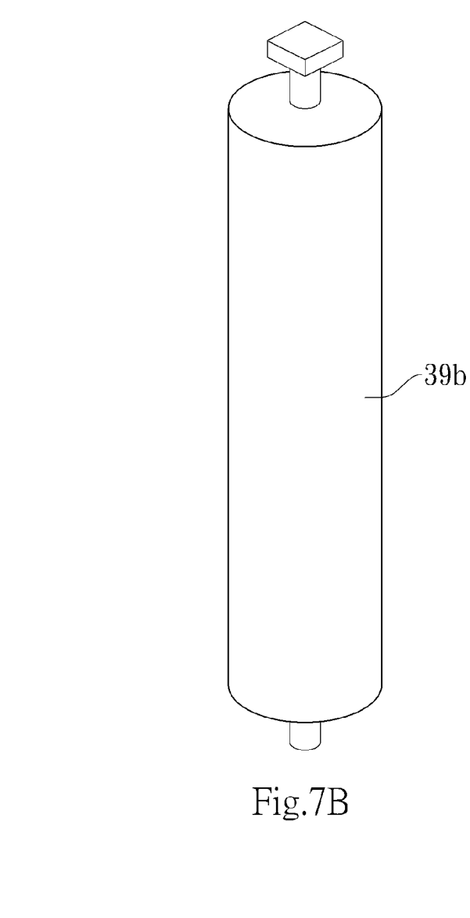
FIG. 7B is a schematic perspective view of another variation of the second flexible element of the lens module of the second embodiment.

Preferably, the first plastic flexible elements 38 are wave-shaped. FIG. 5A shows a schematic cross-sectional view of a variation of the first plastic flexible elements 38, and FIG. 5B shows a schematic side view of the variation. In the variation, the first plastic flexible elements 38a are serrated shape at its opposite longitudinal sides. FIG. 6 is a schematic view of a partial portion of a variation of the second embodiment shown in FIG. 3. In the variation, the lens barrel 32 is provided with four cutting corners instead of the L-shaped accommodation spaces 322 such that the first plastic flexible element 38 still can keep its original length when positioned at the cutting corner. An outer planar surface of the lens barrel 32 in parallel to the optical axis forms the cutting corner. The cutting corner aligns with an outer surface of the auto-focusing coil 33. Preferably, the second plastic flexible elements 39 are formed of a plurality of ball-shaped sub-elements connected in series. FIG. 7A shows a schematic perspective view of a variation of the second plastic flexible elements 39. In the variation, the second plastic flexible element 39a has a rectangular body each of its surface along a longitudinal direction provided with a plurality of concave surfaces and flat surfaces alternately distributed on the surface. FIG. 7B shows a schematic perspective view of another variation of the second plastic flexible elements 39. In the variation shown in FIG. 7B, the second plastic flexible element 39b is formed of a cylindrical body. Please note the flexible elements of these variations may not be limited to plastic material and may be made of metal material.

Figure 8:
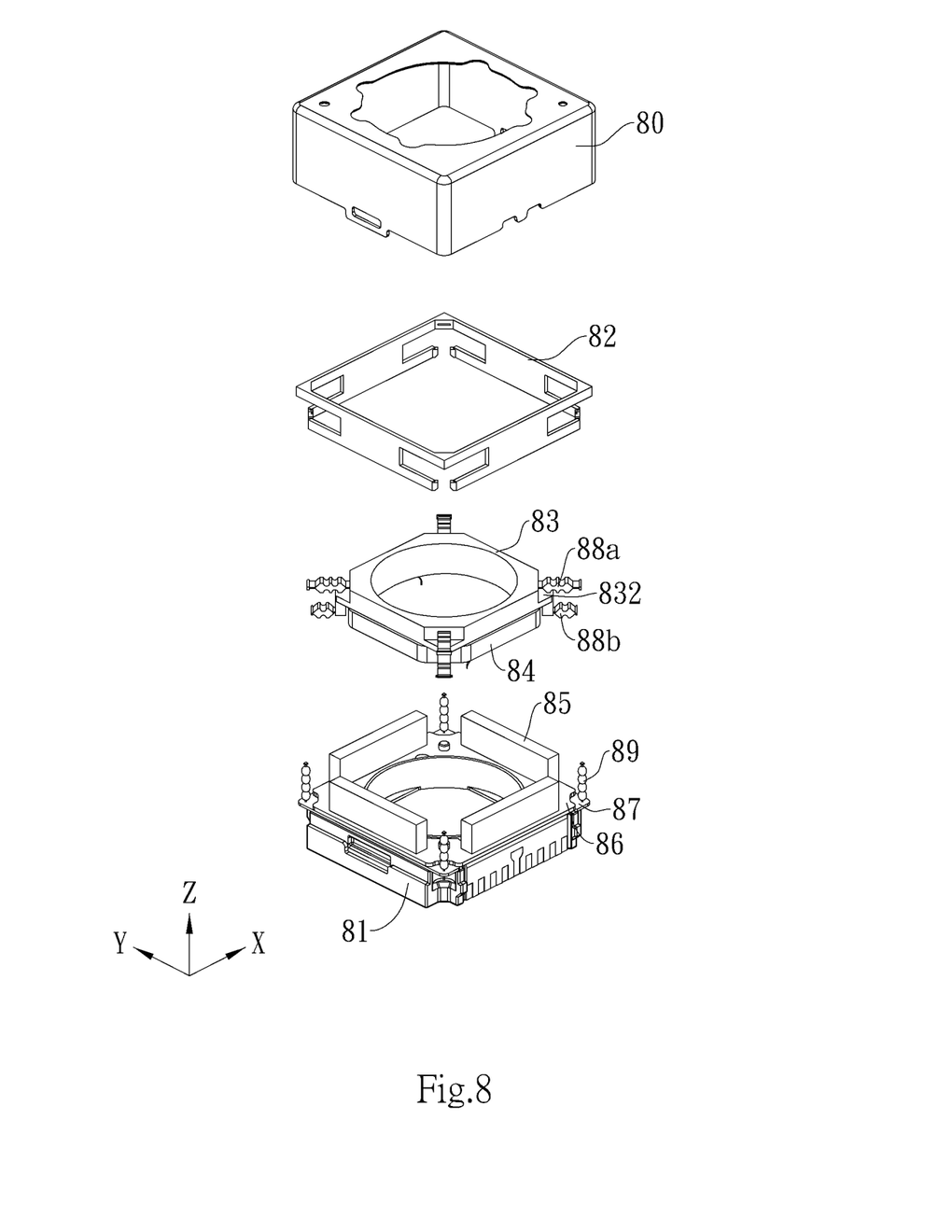
FIG. 8 is a schematic exploded view of a partial portion of a lens module according to a third embodiment.
Figure 9:
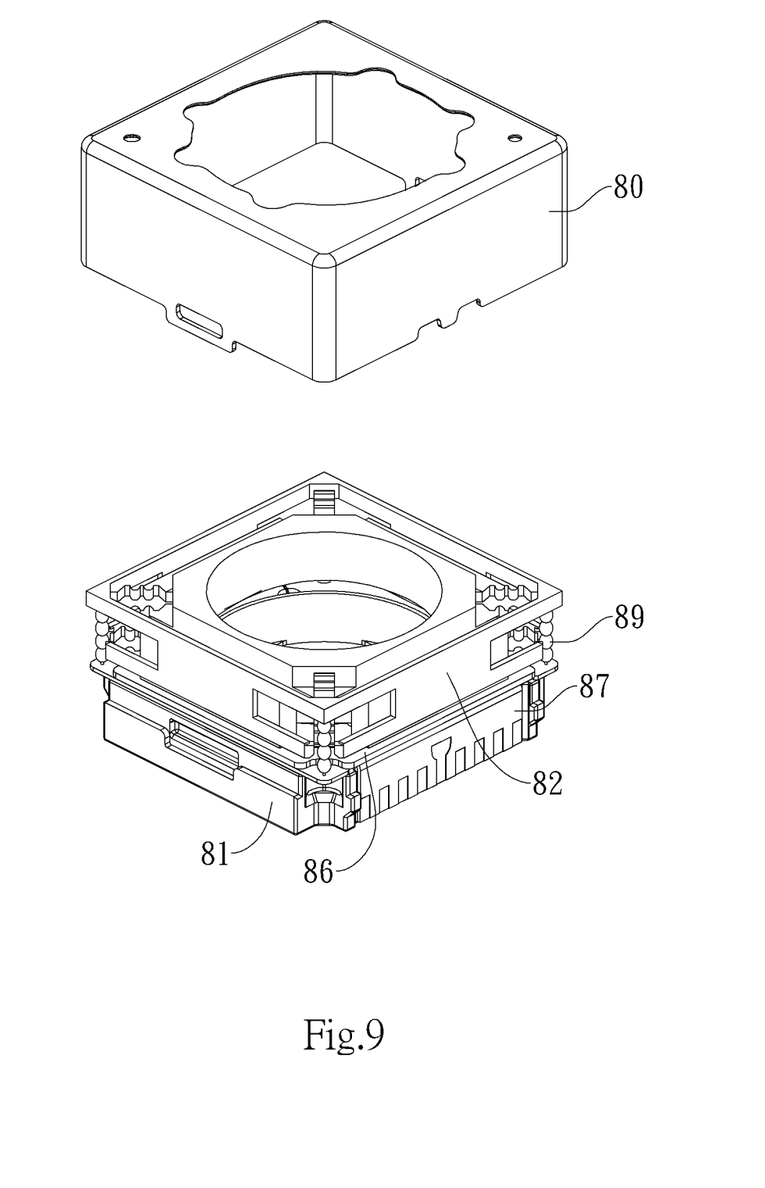
FIG. 9 is another schematic exploded view of the partial portion of the lens module according to the third embodiment.
Figure 10:
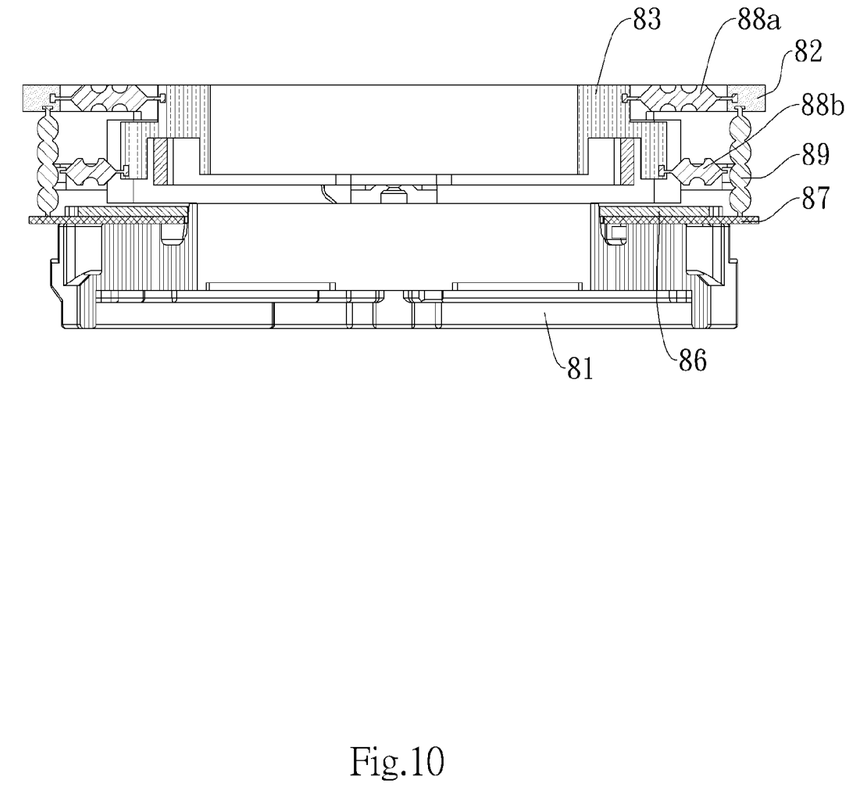
FIG. 10 is a schematic side view of the lens module of the third embodiment.

FIG. 8 is a schematic exploded view of a lens module with OIS means according to a third embodiment of the present invention. FIG. 9 is another schematic exploded view of the lens module of the third embodiment. FIG. 10 is a schematic cross-sectional view of the lens module without an upper cover of the third embodiment. In the third embodiment, the lens module comprises an upper cover 80, a base 81, a frame 82, a lens barrel 83 in which lenses and some other elements are omitted, an auto-focusing coil 84, a set of magnets 85, an OIS coil plate 86 and a printed circuit board 87. Preferably, the lens barrel 83 is provided with four L-shaped accommodation space 832 symmetrically around an upper portion of its outer surrounding. Four first plastic flexible elements 88a are individually received in one of the L-shaped accommodation space 832, and being jointly or integrally formed with the lens barrel 83. It means the first plastic flexible elements 88a and the lens barrel 83 may be formed together with one mold-injection process. Alternatively, the four first plastic flexible elements 88a may be jointly or integrally formed with the frame 82. It means the first plastic flexible elements 88a and the frame 82 may be formed together with one mold-injection process. Please note this configuration is not shown in a drawing but one skilled person in the art would readily know how to accomplish this configuration in view of the configuration of the first plastic flexible elements 88a and the lens barrel 83. The design of the L-shaped accommodation space 832 can advantageously lengthen the first plastic flexible element 88a to enhance its strength bearing plastic deformation without increasing the volume of the lens module. Four second plastic flexible elements 88b are symmetrically positioned at a lower outer portion of the lens barrel 83, and being jointly or integrally formed with the lens barrel 83. Each of the four second plastic flexible elements 88b corresponds to one of the first plastic flexible elements 88b. The second plastic flexible element 88b is shorter than the first plastic flexible element 88a. In the third embodiment, the first plastic flexible elements 88a, the second plastic flexible elements 88b and the lens barrel 83 may be formed together with one mold-injection process. Alternatively, the second plastic flexible elements 88b may be jointly or integrally formed with the frame 82. It means the second plastic flexible elements 88b and the frame 82 may be formed together with one mold-injection process. Please note this configuration is not shown in a drawing but one skilled person in the art would readily know how to accomplish this configuration in view of the configuration of the second plastic flexible elements 88b and the lens barrel 83. The lens barrel 83 is provided with an accommodation space at its lower portion for placing the auto-focusing coil 84. The magnets 85 are symmetrically positioned to face the auto-focusing coil 84. The frame 82 accommodates the lens barrel 83, the auto-focusing coil 84, the magnets 85, the first plastic flexible elements 88a and the second plastic flexible elements 88b. One end of each of the first plastic flexible elements 88a is jointed to one upper corner of the frame 82 such that the first plastic flexible elements 88a are symmetrically positioned between the frame 82 and the lens barrel 83. One end of each of the second plastic flexible elements 88b is jointed to one lower corner of the frame 82 such that the second plastic flexible elements 88b are symmetrically positioned between the frame 82 and the lens barrel 83. Four third plastic flexible elements 89 are symmetrically and individually provided at four corners of the printed circuit board 87. The third plastic flexible elements 89 are jointly or integrally formed with the printed circuit board 87. It means the third plastic flexible elements 89 and the printed circuit board 87 may be formed together with one mold-injection process. Alternatively, the third plastic flexible elements 89 may be jointly or integrally formed with the frame 82. It means the third plastic flexible elements 89 and the frame 82 may be formed together with one mold-injection process. Please note this configuration is not shown in a drawing but one skilled person in the art would readily know how to accomplish this configuration in view of the configuration of the third plastic flexible elements 89 and the printed circuit board 87. One end of each of the third plastic flexible elements 89 opposite to the printed circuit board 87 is jointed to one corner of the frame 82 such that the third plastic flexible elements 89 are symmetrically positioned between the frame 82 and the printed circuit board 87. The OIS coil plate 86 is positioned between the frame 82 and the printed circuit board 87, and electrically communicated with the printed circuit board 87. The OIS coil plate 86 comprises several coils face the magnets 85 and share the magnets 85 with the auto-focusing coil 84. The printed circuit board 87 is positioned on the base 81, and the upper cover 80 houses the frame 82, the lens barrel 83, the magnets 85, the OIS coil plate 86 and the printed circuit board 87, the first plastic flexible elements 88a, the second plastic flexible elements 88b and the third plastic flexible elements 89. The frame 82, the lens barrel 83, the auto-focusing coil 84, the magnets 85, the first plastic flexible elements 88a and the second plastic flexible elements 88b constitute a movable part of the present lens module. The OIS coil plate 86, the printed circuit board 87, the base 81 and the third plastic flexible elements 89 constitute a fixed part of the lens module. The first and second plastic flexible elements 88a and 88b move the movable part along an optical axis direction, i.e. Z-axis direction in the third embodiment, to perform auto-focusing function. The third plastic flexible elements 89 move the movable part along directions perpendicular to the optical axis, i.e. X and Y directions.

Preferably, the first and second plastic flexible elements 88a and 88b have a rectangular body provided with two opposite serrated surfaces along its longitudinal direction. Preferably, the third plastic flexible elements 89 are formed of a plurality of ball-shaped sub-elements connected in series. Optionally, the variation shown in FIG. 7A and FIG. 7B can be used instead of the third plastic flexible elements 89.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A lens module, comprising:
    a movable part having a plurality of lens elements disposed therein;
    a fixed part housing the movable part; and
    a plurality of flexible elements connected between the movable part and fixed part, wherein the flexible elements are connected unto outer planar surfaces of the movable part in parallel to an optical axis of the lens module, the flexible elements are jointly or integrally formed with either of the movable part and fixed part, and the movable part is driven with voice-coil-motor means and optical image stabilization means so that the flexible elements are able to move the movable part along the optical axis direction of the lens module and along directions perpendicular to the optical axis direction.

2. The lens module of claim 1, wherein the outer planar surfaces of the movable part form cutting corners for accommodating the flexible elements correspondingly.

3. The lens module of claim 1, wherein the flexible element is a wave-shaped flexible element.

4. A lens module, comprising:
    a movable part having a plurality of lens elements disposed therein and a plurality of first flexible elements provided therein, wherein the first flexible elements are connected unto outer planar surfaces of the movable part in parallel to an optical axis of the lens module and jointly or integrally formed with the movable part;
    a fixed part disposed under the movable part and having a plurality of second flexible elements provided therein, wherein the second flexible elements are jointly or integrally formed with either of the movable part and fixed part and connected between the movable part and fixed part;
    wherein the movable part is driven with voice-coil-motor means and optical image stabilization means so that the first flexible elements are able to move the movable part along the optical axis direction of the lens module and the second flexible elements are able to move the movable part along directions perpendicular to the optical axis direction.

5. The lens module of claim 4, wherein the first flexible element is a wave-shaped flexible element.

6. The lens module of claim 4, wherein the second flexible element is formed of a plurality of ball-shaped sub-elements connected in series.

7. The lens module of claim 4, wherein the second flexible element has a rectangular body each of its surfaces along a longitudinal direction formed with a plurality of concave surfaces and flat surfaces alternately distributed on the surface.

8. The lens module of claim 4, wherein the second flexible element is formed with a cylindrical body.

9. The lens module of claim 4, wherein the outer planar surfaces of the movable part form cutting corners for accommodating the first flexible elements correspondingly.

10. The lens module of claim 9, wherein the cutting corner is an L-shaped cutting corner.

11. The lens module of claim 9, wherein the first flexible element is a wave-shaped flexible element.

12. The lens module of claim 10, wherein the first flexible element is a serrated flexible element.

13. The lens module of claim 12, further comprising a plurality of third flexible elements shorter than the first flexible elements, wherein the third elements are correspondingly accommodated in the cutting corners of the movable part under the first flexible elements.

14. The lens module of claim 13, wherein the third element is a serrated flexible element.

\* \* \* \* \*